No. 641,807. Patented Jan. 23, 1900.
W. H. TAYLOR.
KEY.
(Application filed Nov. 4, 1899.)
(No Model.)
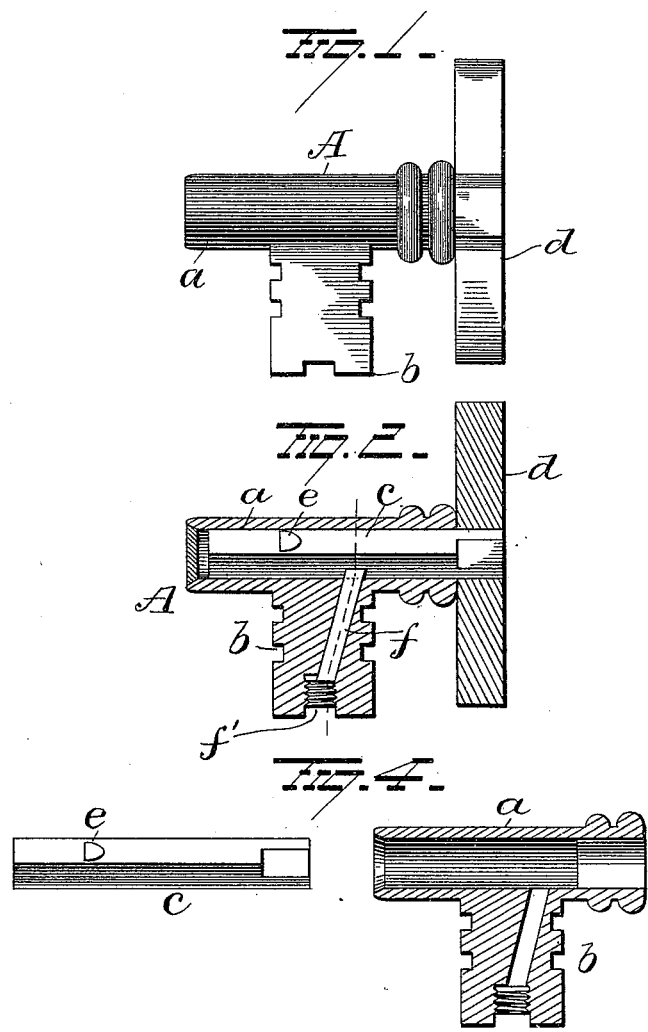
WITNESSES
E. J. Nottingham
G. F. Downing
INVENTOR
W. H. Taylor
By H. A. Seymour
Attorney

UNITED STATES PATENT OFFICE.

WARREN H. TAYLOR, OF STAMFORD, CONNECTICUT, ASSIGNOR TO THE YALE & TOWNE MANUFACTURING COMPANY, OF SAME PLACE.

KEY.

SPECIFICATION forming part of Letters Patent No. 641,807, dated January 23, 1900.

Application filed November 4, 1899. Serial No. 735,804. (No model.)

*To all whom it may concern:*

Be it known that I, WARREN H. TAYLOR, of Stamford, in the county of Fairfield and State of Connecticut, have invented certain new and useful Improvements in Keys; and I do hereby declare the following to be a full, clear, and exact description of the invention, such as will enable others skilled in the art to which it appertains to make and use the same.

My invention relates to an improvement in keys designed particularly for use with the locks employed on sliding doors.

The object of my invention is to provide sliding-door locks with keys adapted for different thicknesses of doors, so that any key can be adjusted to fit a door of any thickness, thus avoiding the necessity of providing a series of keys of different lengths for the various thicknesses of doors.

With these ends in view my invention consists in details of construction, as will be more fully described, and pointed out in the claims.

In the accompanying drawings, Figure 1 is a view in perspective of a key embodying my invention. Fig. 2 is a view in longitudinal section of same. Fig. 3 is a view in transverse section, and Fig. 4 is a view showing the stem and shank separated.

A represents a key consisting of a hollow shank $a$ and the stem $c$, the shank carrying the integral bit $b$ and the stem $c$ carrying the handle $d$. The shank is hollow, and the inner end or neck thereof is provided with an angular opening for the passage of the angular stem $c$, while the interior of the shank behind the inner opening is cylindrical and of slightly-greater diameter than the diameter of the stem, so that the latter is free to move in and out of the shank without contact with the latter except at its neck, which, as before stated, is provided with an angular opening which corresponds in shape to the cross-section of the stem.

By providing the stem with a cylindrical bore terminating in an angular opening of a diameter not greater than the diameter of the cylindrical bore it follows that shoulders are formed at the juncture of the cylindrical bore and angular opening, against which abutments $e$, formed on the stem, abut and prevent a separation of the two parts of the key, and thus prevent the possibility of the loss of either part before they have been secured against longitudinal movement. Again, by making the stem angular and providing the shank with a correspondingly-shaped neck all the torsional strain in turning the key is transmitted from the stem to the shank through the angular neck. Hence there is comparatively little strain on the devices employed for locking the stem and shank together.

The stem and shank of the key are locked together by securing devices located within the bit of the key. These fastening devices consist of a pin $f$ and set-screw $f'$, the pin passing through an inclined bore formed in the bit of the shank and bearing against the stem and held in place by the set-screw $f'$, which is seated in a screw-threaded seat formed in the outer edge of the bit. This screw-threaded seat and the screw therein are greater in diameter than the pin $f$ and instead of being in a line with the pin $f$, which latter, as before explained, is inclined forwardly toward the head of the key, is parallel with the walls of the bit. The inner end of the pin is grooved to engage a corner or angle of the stem, and thus assists in preventing the stem from turning.

These keys are designed for use on doors having cups set into the face of the doors to receive the heads of the keys, so that no portion of the key projects beyond the surface of the doors, thus permitting the doors to be slid into casings formed to receive them, and the parts of the keys are so proportioned that when the shank is wholly within the stem the key can be used on the smallest or thinnest door and by extending the shank its full length will fit the thickest of the regular sizes of doors. This gives me a range of adjustment that will take in all of the regular sizes and also all special sizes within the extremes of the regular sizes.

By locating the securing devices within the bit of the key the set-screw can be of any desired length and size and have bearing sufficient to prevent it from backing out, and by making the securing pin or rod separate the screw can enter at right angles, while the bearing pin or rod enters at an angle, so as to get a bearing on the shank nearer the head, thus giving it greater extensibility. Again, by interposing a pin between the shank and screw the latter has no direct connection with the shank. Hence the twist of the shank, which would tend to loosen up the screw, is not communicated to the screw.

While I have described the stem as having a cylindrical bore within its body and an angular opening at its neck for the passage of the shank, it is evident that the entire bore of the stem might be angular and provided with grooves for the abutments e of the shank.

It is also evident that other slight changes might be resorted to in the construction of the several parts. Hence I would have it understood that I consider myself at liberty to make such changes as fairly fall within the spirit and scope of my invention.

Having fully described my invention, what I claim as new, and desire to secure by Letters Patent, is—

1. A key consisting of a hollow shank having an angular opening in its neck, a stem angular in cross-section and passing through said neck and provided with means for preventing its complete withdrawal from the shank, and devices for securing the shank and stem together.

2. A key consisting of a hollow shank carrying a bit, a stem telescoping with the shank, and securing devices passing through the bit and engaging the shank for locking the parts against movement.

3. A key consisting of a hollow shank carrying a bit, a stem telescoping with the shank, a securing-pin passing through the bit and engaging the shank and a set-screw for locking the pin in place.

4. A key consisting of a hollow shank carrying a bit, a stem telescoping with the shank, a securing-pin passing inwardly and forwardly through the bit and engaging the stem and a set-screw secured within a threaded seat in the bit and locking the pin in place.

In testimony whereof I have signed this specification in the presence of two subscribing witnesses.

WARREN H. TAYLOR.

Witnesses:
SCHUYLER MERRITT,
HENRY C. TAYLOR.